US009930569B2

United States Patent
Catovic et al.

(10) Patent No.: US 9,930,569 B2
(45) Date of Patent: Mar. 27, 2018

(54) SYSTEMS, METHODS AND APPARATUS FOR WIRELESS CONDITION BASED MULTIPLE RADIO ACCESS BEARER COMMUNICATIONS

(75) Inventors: Amer Catovic, Carlsbad, CA (US); Mohamed A. El-saidny, Dubai (AE); Liangchi Hsu, San Diego, CA (US); Rajiv R. Nambiar, San Diego, CA (US); Rajasekar Arulprakasam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 13/539,140

(22) Filed: Jun. 29, 2012

(65) Prior Publication Data

US 2013/0033990 A1 Feb. 7, 2013

Related U.S. Application Data

(60) Provisional application No. 61/515,303, filed on Aug. 4, 2011, provisional application No. 61/539,417, filed on Sep. 26, 2011.

(51) Int. Cl.
*H04W 28/06* (2009.01)
*H04W 52/02* (2009.01)
(Continued)

(52) U.S. Cl.
CPC ....... *H04W 28/06* (2013.01); *H04W 52/0209* (2013.01); *H04W 72/085* (2013.01);
(Continued)

(58) Field of Classification Search
CPC . H04W 76/02; H04W 76/025; H04W 76/064; H04W 72/085; H04W 72/0413
(Continued)

(56) References Cited

U.S. PATENT DOCUMENTS 6,970,437 B2  11/2005  Lott et al.
7,035,240 B1   4/2006  Balakrishnan et al.
(Continued)

FOREIGN PATENT DOCUMENTS

EP   1263160 A1   12/2002
EP   1372310 A1   12/2003
(Continued)

OTHER PUBLICATIONS

3GPP TS 25.321 V10.3.0 (Jun. 2011), 3rd Generation Partnership Project; Technical Specification Group Radio Access Network; Medium Access Control (MAC) protocol specification (Release 10), 198 pages.

(Continued)

*Primary Examiner* — Redentor Pasia
*Assistant Examiner* — Peter Mak
(74) *Attorney, Agent, or Firm* — Knobbe, Martens, Olson & Bear, LLP (57) ABSTRACT

Systems, devices, and methods for wireless condition based multi radio access based wireless communication are provided. In one aspect, a device configured to communicate via a wireless communication link is provided. The device includes a controller configured to send a request for network resources for packet data transmission. The controller may be configured to suppress the request for network resources based in part on a condition of the wireless communication link and a type of wireless communication that is being transmitted by the device.

45 Claims, 6 Drawing Sheets

(51) Int. Cl.
*H04W 72/08* (2009.01)
*H04W 76/06* (2009.01)
*H04W 76/02* (2009.01)

(52) U.S. Cl.
CPC ........ *H04W 76/025* (2013.01); *H04W 76/064* (2013.01); *Y02B 60/50* (2013.01)

(58) Field of Classification Search
USPC .................................. 455/410, 425; 370/242
See application file for complete search history.

(56) References Cited

U.S. PATENT DOCUMENTS

| | | | |
|---|---|---|---|
| 7,289,473 B1 | 10/2007 | Padovani et al. | |
| 7,379,478 B1 | 5/2008 | Mantha | |
| 7,751,320 B2 | 7/2010 | Nuzman et al. | |
| 7,962,148 B2 | 6/2011 | Stamoulis et al. | |
| 8,041,375 B2 | 10/2011 | Laroia et al. | |
| 8,620,337 B2 | 12/2013 | Meredith et al. | |
| 8,634,384 B2 | 1/2014 | Marsh | |
| 8,755,745 B2 | 6/2014 | Gandolfo | |
| 2003/0021262 A1 | 1/2003 | Ma et al. | |
| 2005/0180449 A1 | 8/2005 | Ranta-Aho et al. | |
| 2006/0154603 A1 | 7/2006 | Sachs et al. | |
| 2006/0195727 A1* | 8/2006 | Yoshitsugu et al. | 714/38 |
| 2006/0203738 A1* | 9/2006 | Fok | H04B 17/26 455/452.2 |
| 2006/0209837 A1* | 9/2006 | Lee | H04L 49/90 714/748 |
| 2006/0291395 A1 | 12/2006 | Ketonen et al. | |
| 2008/0008136 A1 | 1/2008 | Padovani et al. | |
| 2008/0043619 A1 | 2/2008 | Sammour et al. | |
| 2008/0130584 A1 | 6/2008 | Pani et al. | |
| 2008/0132268 A1 | 6/2008 | Choi-Grogan et al. | |
| 2008/0144598 A1 | 6/2008 | Jiang | |
| 2008/0186944 A1 | 8/2008 | Suzuki et al. | |
| 2008/0194282 A1 | 8/2008 | Nibe et al. | |
| 2008/0226074 A1 | 9/2008 | Sammour et al. | |
| 2008/0310338 A1 | 12/2008 | Charpenter et al. | |
| 2009/0044067 A1 | 2/2009 | Obuchi et al. | |
| 2009/0093255 A1 | 4/2009 | Balasubramanian | |
| 2009/0104901 A1 | 4/2009 | Baker et al. | |
| 2009/0135773 A1 | 5/2009 | Aghili et al. | |
| 2009/0157852 A1* | 6/2009 | Krupkin et al. | 709/220 |
| 2009/0161545 A1 | 6/2009 | Ho et al. | |
| 2009/0175175 A1 | 7/2009 | Somasundaram et al. | |
| 2010/0008302 A1 | 1/2010 | Sayers et al. | |
| 2010/0034114 A1 | 2/2010 | Kim et al. | |
| 2010/0091723 A1 | 4/2010 | Park et al. | |
| 2010/0113006 A1 | 5/2010 | Pajjuri et al. | |
| 2010/0144363 A1 | 6/2010 | De Rosa et al. | |
| 2010/0165901 A1 | 7/2010 | Kim | |
| 2010/0195519 A1 | 8/2010 | Ji | |
| 2010/0220615 A1 | 9/2010 | Enstrom et al. | |
| 2010/0260049 A1 | 10/2010 | Racz et al. | |
| 2010/0278341 A1 | 11/2010 | Kubota | |
| 2010/0316040 A1 | 12/2010 | Kim et al. | |
| 2010/0323748 A1 | 12/2010 | Padovani et al. | |
| 2011/0009073 A1 | 1/2011 | Burbidge et al. | |
| 2011/0019756 A1 | 1/2011 | Chun et al. | |
| 2011/0105174 A1 | 5/2011 | Pelletier et al. | |
| 2011/0111765 A1* | 5/2011 | Yang | H04W 72/0486 455/452.1 |
| 2011/0149787 A1 | 6/2011 | Digirolamo et al. | |
| 2011/0158140 A1 | 6/2011 | Asokan | |
| 2011/0158194 A1 | 6/2011 | Musikka et al. | |
| 2011/0179329 A1 | 7/2011 | Kim et al. | |
| 2011/0194479 A1 | 8/2011 | Jin et al. | |
| 2011/0243080 A1 | 10/2011 | Chen et al. | |
| 2011/0249563 A1 | 10/2011 | Provvedi et al. | |
| 2011/0268088 A1 | 11/2011 | Lindskog et al. | |
| 2011/0269463 A1 | 11/2011 | Wang et al. | |
| 2011/0286387 A1 | 11/2011 | Sane et al. | |
| 2011/0317719 A1 | 12/2011 | Vedantham et al. | |
| 2012/0002541 A1 | 1/2012 | Lee et al. | |
| 2012/0008573 A1* | 1/2012 | Shiva | H04W 72/1252 370/329 |
| 2012/0009930 A1* | 1/2012 | Brisebois | H04W 52/0264 455/450 |
| 2012/0020286 A1 | 1/2012 | Damnjanovic et al. | |
| 2012/0026921 A1 | 2/2012 | Choi | |
| 2012/0064908 A1* | 3/2012 | Fox | H04W 28/10 455/452.2 |
| 2012/0069750 A1* | 3/2012 | Xing | H04W 76/045 370/252 |
| 2012/0082096 A1 | 4/2012 | Cave et al. | |
| 2012/0083264 A1* | 4/2012 | Ramasamy et al. | 455/425 |
| 2012/0093110 A1 | 4/2012 | Somasundaram et al. | |
| 2012/0177089 A1* | 7/2012 | Pelletier | H04B 7/0417 375/219 |
| 2012/0178438 A1 | 7/2012 | Vashi et al. | |
| 2012/0201134 A1 | 8/2012 | Wang et al. | |
| 2012/0264397 A1* | 10/2012 | Meredith | H04W 76/02 455/410 |
| 2012/0269148 A1 | 10/2012 | Hultell et al. | |
| 2013/0003523 A1 | 1/2013 | Singh et al. | |
| 2013/0003542 A1 | 1/2013 | Catovic et al. | |
| 2013/0003631 A1 | 1/2013 | Catovic et al. | |
| 2013/0021915 A1 | 1/2013 | Catovic et al. | |
| 2013/0064098 A1 | 3/2013 | El-Saidny et al. | |
| 2013/0077616 A1 | 3/2013 | Arulprakasam et al. | |
| 2013/0148499 A1 | 6/2013 | Racz et al. | |
| 2014/0133323 A9 | 5/2014 | Guarino | |
| 2015/0009950 A1 | 1/2015 | Sundberg et al. | |

FOREIGN PATENT DOCUMENTS

| | | |
|---|---|---|
| EP | 1465371 A1 | 10/2004 |
| EP | 1653758 A1 | 5/2006 |
| EP | 1768296 A2 | 3/2007 |
| EP | 1811690 A1 | 7/2007 |
| EP | 1956728 A2 | 8/2008 |
| EP | 2256996 A1 | 12/2010 |
| EP | 2317815 A1 | 5/2011 |
| JP | 2006087113 A | 3/2006 |
| JP | 2007531464 A | 11/2007 |
| JP | 2008048325 A | 2/2008 |
| JP | 2008199157 A | 8/2008 |
| JP | 2009044370 A | 2/2009 |
| JP | 2009517935 A | 4/2009 |
| JP | 2009188739 A | 8/2009 |
| JP | 2010212893 A | 9/2010 |
| JP | 2011518468 A | 6/2011 |
| JP | 2012521150 A | 9/2012 |
| JP | 2013506364 A | 2/2013 |
| WO | 0038368 A1 | 6/2000 |
| WO | 0122645 A1 | 3/2001 |
| WO | 0193513 A2 | 12/2001 |
| WO | 2005011212 A1 | 2/2005 |
| WO | 2005015940 A1 | 2/2005 |
| WO | 2005112500 A1 | 11/2005 |
| WO | 2006012377 A1 | 2/2006 |
| WO | 2008097544 A2 | 8/2008 |
| WO | 2009046374 | 4/2009 |
| WO | 2009058085 A2 | 5/2009 |
| WO | 2009116939 A2 | 9/2009 |
| WO | 2010088295 A1 | 8/2010 |
| WO | 2010107360 A1 | 9/2010 |
| WO | 2011025438 A1 | 3/2011 |
| WO | 2011072735 A1 | 6/2011 |

OTHER PUBLICATIONS

3GPP TS 25.331 V10.3.1, "3rd Generation Partnership Project; Technical Specification Group Radio Access Network; Radio Resource Control (RRC); Protocol Specification (Release 10)" (Apr. 2011).
Brunner, et al., "Inter-System Handover Parameter Optimization," 2006 IEEE 64th Vehicular Technology Conference, pp. 1-6.
International Search Report and Written Opinion—PCT/US2012/045329—ISA/EPO—dated Oct. 30, 2012.

(56) References Cited

OTHER PUBLICATIONS

Siemens: "Contribution to Power Limit Problem in HSDPA Case", 3GPP Draft; R2-040981, 3rd Generation Partnership Project (3GPP), Mobile Competence Centre ; 650, Route Des Lucioles ; F-06921 Sophia-Antipolis Cedex ; France, vol. RAN WG2, No. Montreal, Canada; May 17, 2004, May 17, 2004 (May 17, 2004), XP050125851.

Xu, et al., "Performance Analysis on the Radio Link Control Protocol of UMTS System," Proceedings from 2002 IEEE 56th Vehicular Technology Conference, vol. 4, pp. 2026-2030.

Samsung, "CQI and ACK/NACK Transmission Supporting Dual-Cell HSDPA", 3GPP TSG-RAN WG1#54b, R1-083562, Oct. 3, 2008.

Renesas Mobile Europe Ltd: "Cell update-less RLC/PDCP unrecoverable error recovery", 3GPP R2-113178, 3GPP, May 9, 2011, 2 Pages.

* cited by examiner

SYSTEMS, METHODS AND APPARATUS FOR WIRELESS CONDITION BASED MULTIPLE RADIO ACCESS BEARER COMMUNICATIONS

CROSS-REFERENCE TO RELATED APPLICATIONS

The disclosure claims priority to U.S. Provisional Patent Application No. 61/515,303, filed Aug. 4, 2011, entitled "SYSTEMS, METHODS AND APPARATUS FOR CONTROLLING NEW WIRELESS COMMUNICATION SESSION INITIATION," and assigned to the assignee hereof, and to U.S. Provisional Patent Application No. 61/539,417, filed Sep. 26, 2011, entitled "SYSTEMS, METHODS AND APPARATUS FOR WIRELESS CONDITION BASED MULTIPLE RADIO ACCESS BEARER COMMUNICATIONS," and assigned to the assignee hereof. The disclosure of both prior applications are considered part of, and are incorporated by reference in, this disclosure.

BACKGROUND

Aspects of the present invention relate to wireless communication, and in particular, to systems, method and apparatus configured to enable multiple radio access bearer communications based on wireless conditions.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals (e.g. cellphones, tablet computers and other electronic devices). Each wireless terminal communicates with one or more base stations via transmissions on one or more uplinks and downlinks. A downlink (or forward link) refers to the communication link from the base stations to the wireless terminal, and an uplink (or reverse link) refers to the communication link from the wireless terminal to the base station. These communication links may be established via a single-in-single-out (SISO), multiple-in-single-out (MISO), or a multiple-in-multiple-out (MIMO) system.

A MIMO system employs multiple transmit antennas and multiple receive antennas for data transmission. A MIMO channel formed by the transmit and receive antennas may be decomposed into independent channels, which are also referred to as spatial channels. Each of the independent channels corresponds to a dimension. The MIMO system can provide improved performance (e.g., higher throughput and/or greater reliability) if the additional dimensions created by the multiple transmit and receive antennas are utilized.

A MIMO system supports time division duplex (TDD) and frequency division duplex (FDD) systems. In a TDD system, the uplink and downlink transmissions are within the same frequency region so that the reciprocity principle allows the estimation of the downlink channel from the uplink channel. This enables the base station to extract transmit beamforming gain on the downlink when multiple antennas are available at the base station.

The primary purpose of the base station is to provide connectivity between a wireless terminal or terminals and the core communications network. In a UMTS radio access network (RAN), the functionalities of a base station may be split across two network elements: the Radio Network Controller (RNC) handles, among other functions, connection setup, resource assignment and mobility; the base node (NodeB) configured to handle the radio transmission and reception to and from wireless terminals as well as the resource allocation for connected users on the shared channels.

To establish a call connection between a wireless terminal and a base station, a Radio Access Bearer (RAB) is needed. The RAB carries voice or other data between the wireless terminal and the core communication network. There are different types of RABs for different types of data, such as, for example, voice data, streaming data (e.g. streaming a video clip), interactive data (e.g. interacting with a website) and others. Simultaneous voice and data connections require multiple RABs and may be referred to as Multi-RAB or MRAB connections. In the early days of combined voice and data networks, e.g. 3G UMTS, simultaneous voice and data connections were not prevalent. However, newer wireless terminal devices (e.g. touch-screen cellular telephones) increasingly use voice and data connections simultaneously. MRAB calls are known to experience an increased rate of dropped calls or connections compared to single RAB calls or connections. One cause for may be due to, for example, variable wireless signal conditions. Accordingly, there is a need to improve the communication between a wireless terminal and a base station during MRAB calls.

SUMMARY

Various implementations of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage power allocation to various channels in MRAB calls.

In an aspect, a method of wireless communication is provided. The method includes establishing a wireless communication link. The method further includes suppressing, in a mobile wireless device, a request to a network. The suppressed request is for additional network resources for packet data transmission in an existing voice and data communication, or new network resources for packet data transmission in an existing voice communication. The suppressing is based in part on a condition of the wireless communication link and a type of existing wireless communication being transmitted.

In one embodiment, the method can further include receiving a request for a new session establishment. The method can further include determining quality of a current wireless communication session. The method can further include transmitting the new session establishment request to a wireless communication network upon satisfactory quality of the current wireless communication session. The method can further include rejecting the new session establishment request upon unsatisfactory quality of the current wireless communication session.

In another aspect, a device configured to communicate via a wireless communication link is provided. The device includes a transmitter configured to establish a wireless communication link and to transmit a wireless communication. The device further includes a controller configured to suppress a request to a network. The request is for additional network resources for packet data transmission in an existing voice and data communication, or new network resources for packet data transmission in an existing voice communication. The controller is configured to suppress the request based in part on a condition of the wireless communication link and a type of existing wireless communication being transmitted.

In one embodiment, the controller can be further configured to receive a request for a new session establishment. The controller can be further configured to determine a quality of a current wireless communication session. The controller can be further configured to transmit the new session establishment request to a wireless communication network upon satisfactory quality of the current wireless communication session. The controller can be further configured to reject the new session establishment request upon unsatisfactory quality of the current wireless communication session.

In another aspect, another device configured to communicate via a wireless communication link is provided. The device includes means for establishing the wireless communication link. The device further includes means for suppressing, in a mobile wireless device, a request to a network. The request is for additional network resources for packet data transmission in an existing voice and data communication, or new network resources for packet data transmission in an existing voice communication. The suppressing is based in part on a condition of the wireless communication link and a type of existing wireless communication being transmitted.

In one embodiment, the device can further include means for receiving a request for a new session establishment. The device can further include means for determining quality of a current wireless communication session. The device can further include means for transmitting the new session establishment request to a wireless communication network upon satisfactory quality of the current wireless communication session. The device can further include means for rejecting the new session establishment request upon unsatisfactory quality of the current wireless communication session.

In another aspect, a non-transitory computer readable storage medium is provided. The medium includes instructions that, when executed by at least one processor of an apparatus, cause the apparatus to establish a wireless communication link. The medium further includes instructions that, when executed by at least one processor of the apparatus, cause the apparatus to suppress, in a mobile wireless device, a request to a network. The request is for additional network resources for packet data transmission in an existing voice and data communication, or new network resources for packet data transmission in an existing voice communication. The suppression is based in part on a condition of the wireless communication link and a type of existing wireless communication being transmitted.

In one embodiment, the medium can further include instructions that, when executed by at least one processor of the apparatus, cause the apparatus to receive a request for a new session establishment. The medium can further include instructions that, when executed by at least one processor of the apparatus, cause the apparatus to determine quality of a current wireless communication session. The medium can further include instructions that, when executed by at least one processor of the apparatus, cause the apparatus to transmit the new session establishment request to a wireless communication network upon satisfactory quality of the current wireless communication session. The medium can further include instructions that, when executed by at least one processor of the apparatus, cause the apparatus to reject the new session establishment request upon unsatisfactory quality of the current wireless communication session.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2).

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As a wireless terminal (WT) or user equipment (UE) moves through such a network, the wireless terminal may be served in certain locations by base stations (BSs) or access nodes (ANs) that provide macro coverage while the wireless terminal may be served at other locations by access nodes that provide smaller scale coverage, e.g. femto nodes (FNs). In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, access point, base station, Node B, eNodeB, macro cell, and so on. Also, a femto node may be configured or referred to as a Home NodeB (HNB), Home eNodeB (HeNB), access point access point, femto cell, and so on.

Figure 1:
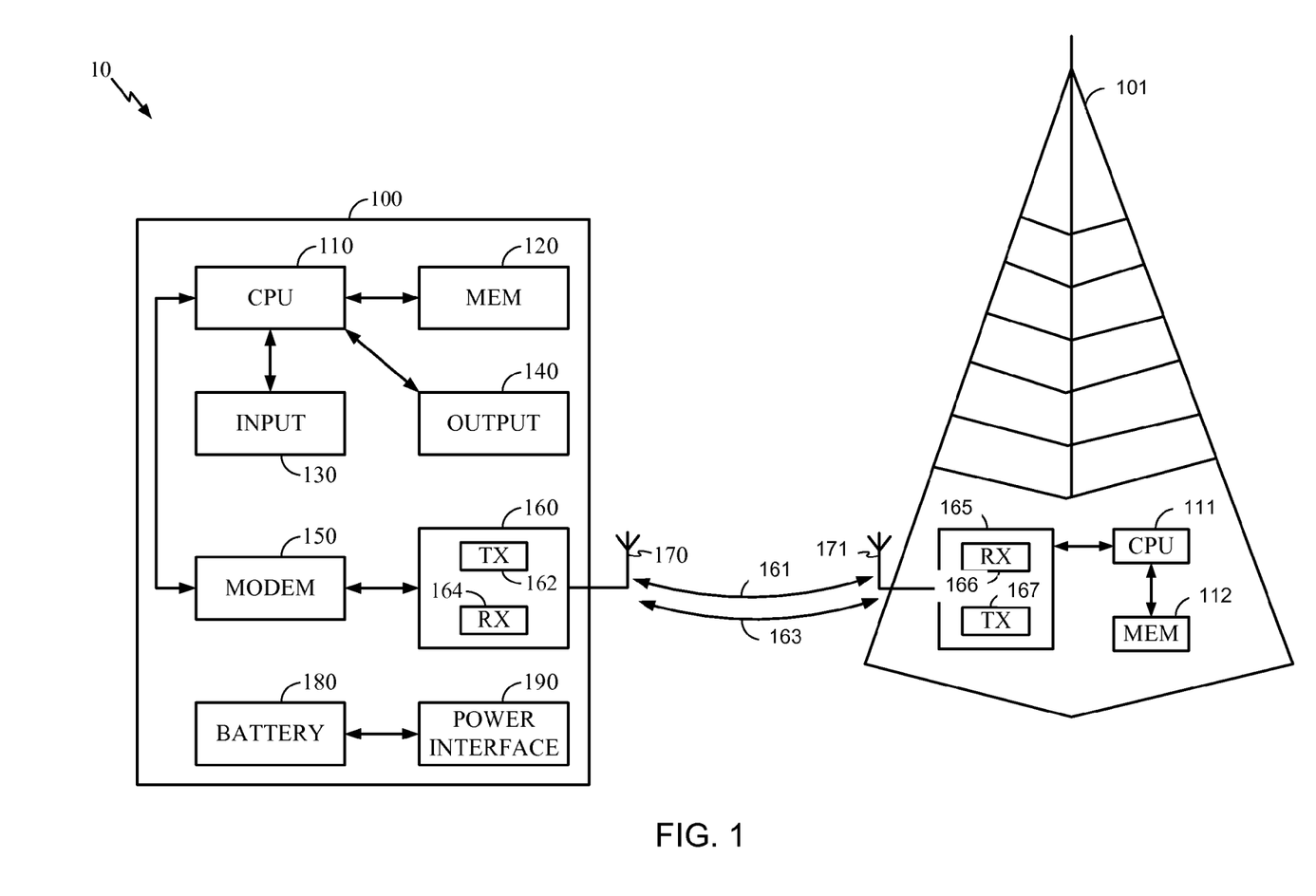
FIG. 1 shows an exemplary functional block diagram of a wireless communication system.

FIG. 1 shows an exemplary functional block diagram of a wireless communication system. The wireless communication system 10 may include at least one wireless terminal 100 and at least one base station 101 configured to communicate with each other over a first communication link 161 and a second communication link 163. Each of the first and second communication links 161, 163 can be a single-packet communication link on which a single packet may be transmitted during each cycle or a multi-packet communication link on which on which multiple packets may be transmitted during each cycle. For example, the first communication link 161 can be a dual-packet communication link on which zero, one, or two packets can be transmitted during each cycle.

In the implementation shown in FIG. 1, the wireless terminal 100 includes a processor 110 coupled with a memory 120, an input device 130, and an output device 140. The processor may be coupled with a modem 150 and a transceiver 160. The transceiver 160 shown is also coupled with the modem 150 and an antenna 170. The wireless terminal 100 and components thereof may be powered by a battery 180 and/or an external power source. In some implementations, the battery 180, or a portion thereof, is rechargeable by an external power source via a power interface 190. Although described separately, it is to be appreciated that functional blocks described with respect to the wireless terminal 100 need not be separate structural elements. For example, the processor 110 and memory 120 may be implemented in a single chip. Similarly, two or more of the processor 110, modem 150, and transceiver 160 may be implemented in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

In the implementation shown in FIG. 1, the processor 110 can be coupled, via one or more buses, with read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled with an input device 130 and an output device 140 configured for, respectively, receiving input from and providing output to, a user of the wireless terminal 100. Suitable input devices may include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled with audio processing software to, e.g., detect voice commands). Suitable output devices may include, but are not limited to, visual output devices, including displays and printers, audio output devices, including speakers, headphones, earphones, and alarms, and haptic output devices, including force-feedback game controllers and vibrating devices.

The processor 110 may be coupled with a modem 150 and a transceiver 160. The modem 150 and transceiver 160 may be configured to prepare data generated by the processor 110 for wireless transmission over the communication links 161, 163 via the antenna 170. The modem 150 and transceiver 160 also demodulate data received over the communication links 161, 163 via the antenna 170. In some implementations, the modem 150 and the transceiver 160 may be configured to operate according to one or more air interface standards. The transceiver can include a transmitter 162, a receiver 164, or both. In other implementations, the transmitter 162 and receiver 164 are two separate components. The modem 150 and transceiver 160, can be implemented as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/multiple-output (MIMO) communication.

The wireless terminal 100 and components thereof may be powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some implementations, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some implementations, the wireless terminal 100 is a mobile telephone, a personal data assistant (PDAs), a handheld computer, a laptop computer, a wireless data access card, a GPS receiver/navigator, a camera, an MP3 player, a camcorder, a game console, a wrist watch, a clock, or a television.

As shown in FIG. 1, the base station 101 also includes at least a processor 111 coupled with a memory 112 and a transceiver 165. The transceiver 165 includes a transmitter 167 and a receiver 166 coupled with an antenna 171. The processor 111, memory 112, transceiver 165, and antenna 171 can be implemented as described above with respect to the wireless terminal 100.

In the wireless communication system 10 of FIG. 1, the base station 101 can transmit data packets to the wireless terminal 100 via a first communication link 161 and/or a second communication link 163.

Figure 2:
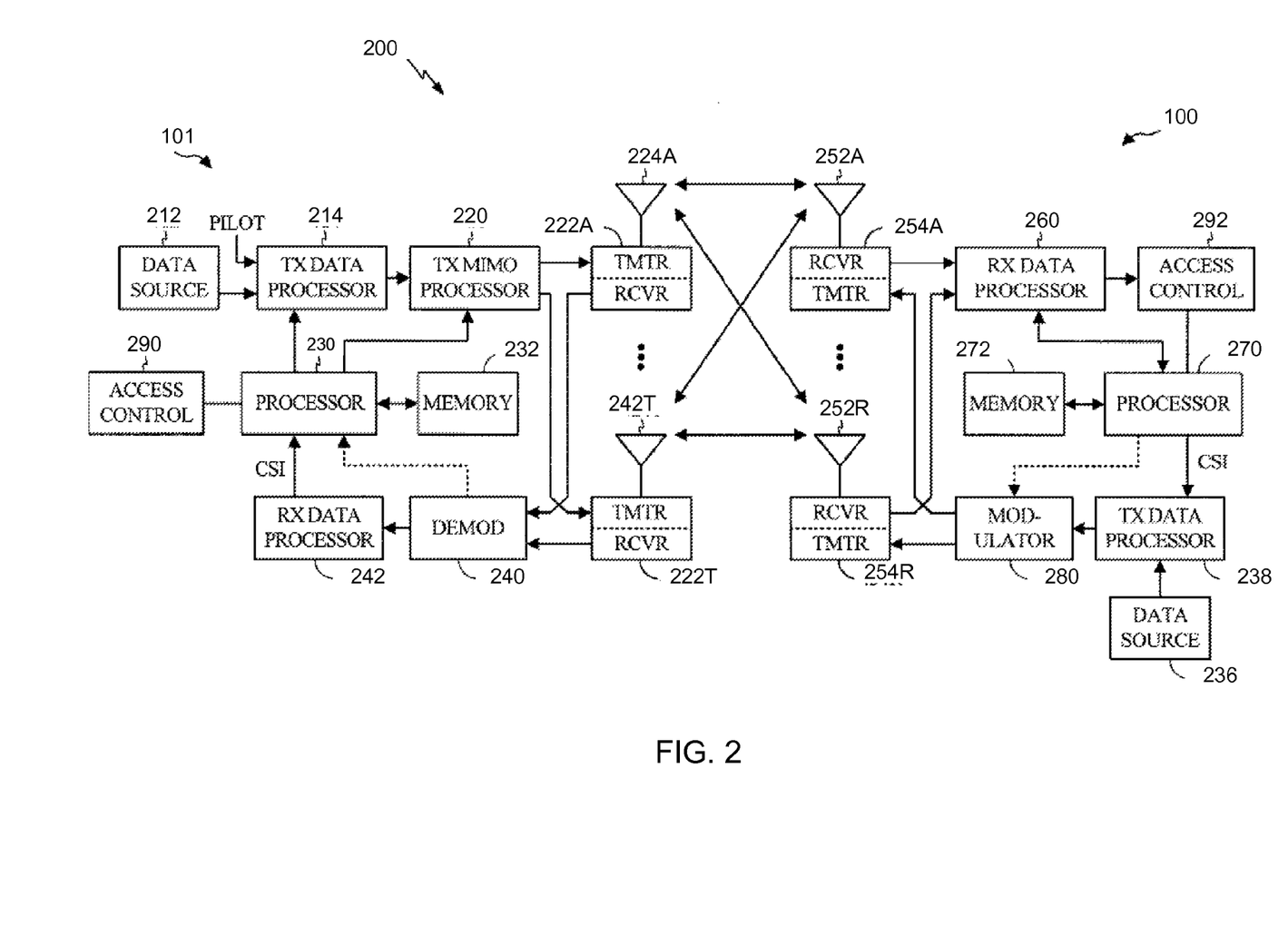
FIG. 2 shows an exemplary functional block diagram of components that may be employed to facilitate communication between communication nodes, such as a wireless terminal and a base station.

FIG. 2 shows an exemplary functional block diagram of components that may be employed to facilitate communication between communication nodes, such a wireless terminal 100 and a base station 101. Specifically, FIG. 2 is a simplified block diagram of a first wireless device 101 (e.g., a base station) and a second wireless device 100 (e.g., a wireless terminal) of a communication system 200. At the first device 101, traffic data for a number of data streams is provided from a data source 212 to a transmit (TX) data processor 214.

In some implementations, each data stream is transmitted over a respective transmit antenna. The TX data processor 214 may be configured to format, code, and interleave the traffic data for each data stream based on a particular coding scheme selected for that data stream.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the device 210.

In the implementation shown in FIG. 2, the modulation symbols for some data streams may be provided to a TX MIMO processor 220, which may further process the modulation symbols (e.g., for OFDM). The TX MIMO processor 220 then provides modulation symbol streams to transceivers (XCVR) 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the channel. Modulated signals from transceivers 222A through 222T are then transmitted from antennas 224A through 224T, respectively.

At the second device 100, the transmitted modulated signals are received by antennas 252A through 252R and the received signal from each antenna 252 is provided to a respective transceiver (XCVR) 254A through 254R. Each transceiver 254 may be configured to condition (e.g., filters, amplifies, and downconverts) a respective received signal, digitizes the conditioned signal to provide samples, and further processes the samples to provide a corresponding "received" symbol stream.

A receive (RX) data processor 165 then receives and processes the received symbol streams from transceivers 254 based on a particular receiver processing technique to provide "detected" symbol streams. The RX data processor 165 then demodulates, deinterleaves, and decodes each detected symbol stream to recover the traffic data for the data stream. The processing by the RX data processor 165 is complementary to that performed by the TX MIMO processor 220 and the TX data processor 214 at the device 210.

The processor 270 formulates an uplink message, which may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 101.

At the device 101, the modulated signals from the second device 100 are received by the antennas 224, conditioned by the transceivers 222, demodulated by a demodulator (DEMOD) 240, and processed by an RX data processor 242 to extract the uplink message transmitted by the second device 100. The processor 230 then processes the extracted message.

FIG. 2 also illustrates that the communication components may include one or more components that perform access control. For example, an access control component 290 may cooperate with the processor 230 and/or other components of the device 101 to send/receive signals to/from another device (e.g., device 100). Similarly, an access control component 292 may cooperate with the processor 270 and/or other components of the device 100 to send/receive signals to/from another device (e.g., device 101). It should be appreciated that for each device 101 and 100 the functionality of two or more of the described components may be provided by a single component. For example, a single processing component may provide the functionality of the access control component 290 and the processor 230 and a single processing component may provide the functionality of the access control component 292 and the processor 270.

Figure 3:
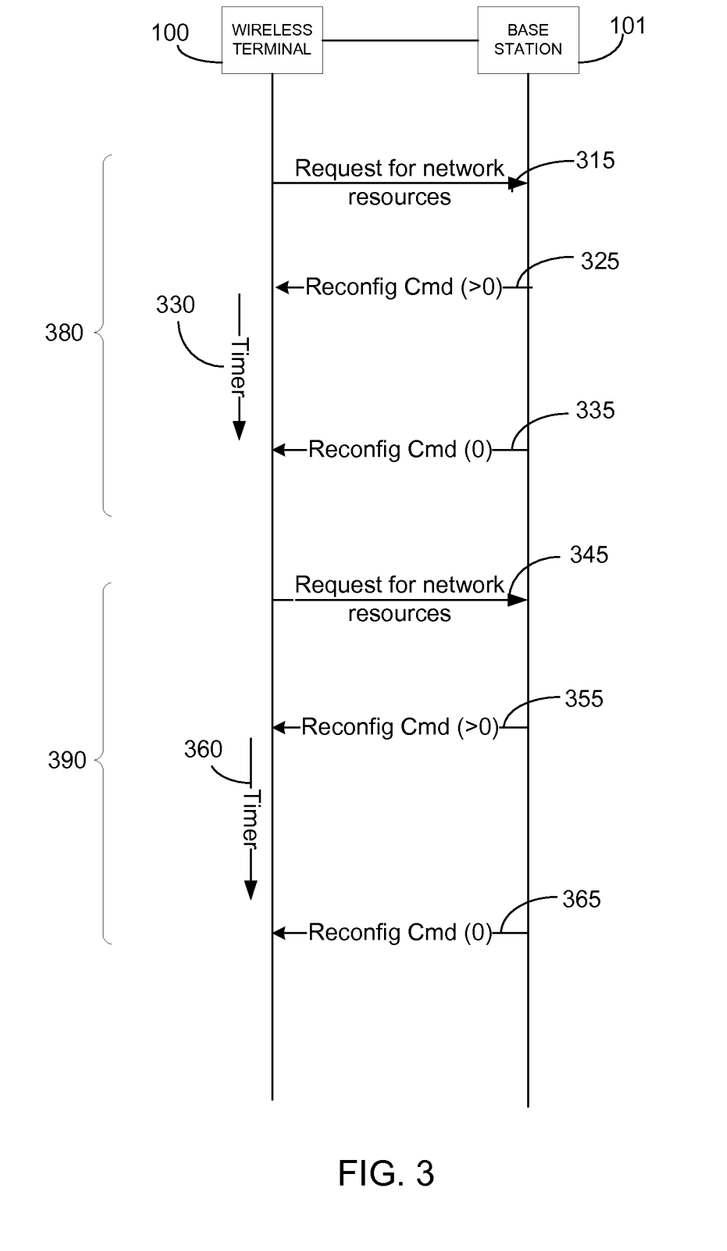
FIG. 3 illustrates a protocol exchange that may occur between base station 101 and wireless terminal 100.

FIG. 3 illustrates a protocol exchange that may occur between base station 101 and wireless terminal 100. The interface between base station 101 and wireless terminal 100 may be described by a protocol stack that consists of a number of protocol layers, each giving a specific service to the next layer above and/or below. For example, a top layer of the protocol stack, sometimes referred to as the radio resource control (RRC) layer, may control signaling to control the wireless connection to the wireless terminal 100. This layer may additionally provide control of aspects of the wireless terminal 100 from the base station 101 and may include functions to control radio bearers, physical channels, mapping of different channel types, measurement and other functions.

According to the RRC protocol, a wireless terminal 100 may request network resources for packet data transmission. In some implementations, this may be accomplished by performing traffic volume measurement reporting. For example, a wireless terminal 100 may transmit a request for network resources for packet data transmission 315 to a base station 101. The request 315 may indicate, for example, that a transport channel traffic volume is larger than a threshold. Alternatively, the request 315 may indicate that the transport channel traffic volume has become smaller than a threshold.

Requests for network resources 315 may be sent periodically, for example, at the expiration of a timer. Alternatively, these requests may be sent when specific conditions occur. For example, requests for network resources 315 may be sent when the transport channel traffic volume held by the wireless terminal 101 crosses one of the thresholds described above.

By receiving requests for network resources, the base station 101 may monitor the flow of data from wireless terminal 100. Additionally, other wireless terminals (not shown) may also send requests for network resources 315 or traffic volume measurements to base station 101. In response to the request for network resources 315, the base station 101 may transmit a Radio Access Bearer reconfiguration command 325. The reconfiguration command 325 may allow the base station 101 to reconfigure the transmission window size available to the wireless terminal 100. A transmission window size may define the number of bytes that may be transferred from the wireless terminal 100 to the base station 101. When the base station 101 is notified, via the traffic volume measurement, that the wireless terminal 100 has data available for transmission on the channel, the base station 101 may respond with a reconfiguration command 335 that provides a non-zero send window to the wireless terminal 100. The base station 101 may then establish a timer 330 to track if and when the wireless terminal 100 sends data to the base station 101.

Wireless communication conditions may prevent the wireless terminal 100 from transmitting data to the base station 101 after the non-zero send window has been provided by the reconfiguration command 325. For example, wireless conditions may cause the wireless terminal 100 to use a majority of the available transmit power to send voice data to the base station 101. The remaining transmit power may not be sufficient for successful packet data transmission. If the wireless terminal 100 does not transmit data to the base station 101 before the timer 330 expires, the base station 101 may send another RAB reconfiguration command 335 that specifies a zero send window for the wireless terminal 100.

The condition of the wireless communication link may prevent the wireless terminal 100 from transmitting data to the base station 101 include at least one of a quality of a wireless signal received by the device, an error rate for signals received by the device, a number of packet retransmissions from the device, a power state of the device, and a reset of the wireless communication link. For example, when the device is in a power limited state, the device.

After the above described sequence of request for network resources for packet data transmission, or traffic volume measurements, and reconfiguration commands, the amount of transport channel traffic volume held by the wireless terminal 100 may still be larger than a threshold. The wireless terminal 100 may send another request for network resources for packet data transmission 345. In some implementations, the wireless terminal 100 may send a RRC traffic volume measurement. As before, the base station 101 may send a RAB reconfiguration command 355 to the wireless terminal 100, providing a non-zero send window. Base station 101 may also set time 360 to track any data sent by wireless terminal 100 after the reconfiguration command 355. Wireless conditions may continue to prevent wireless terminal 100 from sending data in response to the non-zero send window. After the base station's timer 360 expires, the base station 101 may send another reconfiguration command 365 that sets the send window to zero.

The described protocol exchanges represent a repeating pattern 380 and 390. This repeating pattern 380 and 390 consumes network capacity and may in some implementations increase power consumption by wireless terminal 100. Furthermore, the probability of the illustrated messages being lost may increase if this repeating pattern occurs during adverse wireless conditions. If the number of messages lost exceeds a threshold, and the wireless terminal 100 has an active MRAB connection, the wireless terminal 100 may disconnect not only the data communication portion but also the voice communication portion of the connection. This can occur despite the lost message occurring on the data communication link.

Thus, one cause contributing to higher dropped connection rates for MRAB connections (e.g. simultaneous voice and data connections) as compared to single RAB connections (e.g. voice only connection) may be the repeating pattern 380 and 390 between the wireless terminal 100 and the base station 101 under adverse wireless conditions. The repeating pattern 380 and 390 between the wireless terminal 100 and the base station 101 over the data communication link during poor wireless communication conditions may increase the likelihood of dropped packets and therefore dropped connections. The wireless communication conditions may be suitable for voice connections; however, the wireless terminal 100 may be configured to reset all wireless connections when a failure occurs on only one wireless connection. Accordingly, one method to reduce dropped wireless connections at the wireless terminal 100 may include preventing pattern 380 and 390 between the wireless terminal 100 and/or the base station 101 based on the type of call and the wireless communication conditions. For example, the pattern 380 and 390 may be prevented in some implementations by suppressing the request for network resources for packet data transmission, such as requests 315 or 345.

Figure 4:
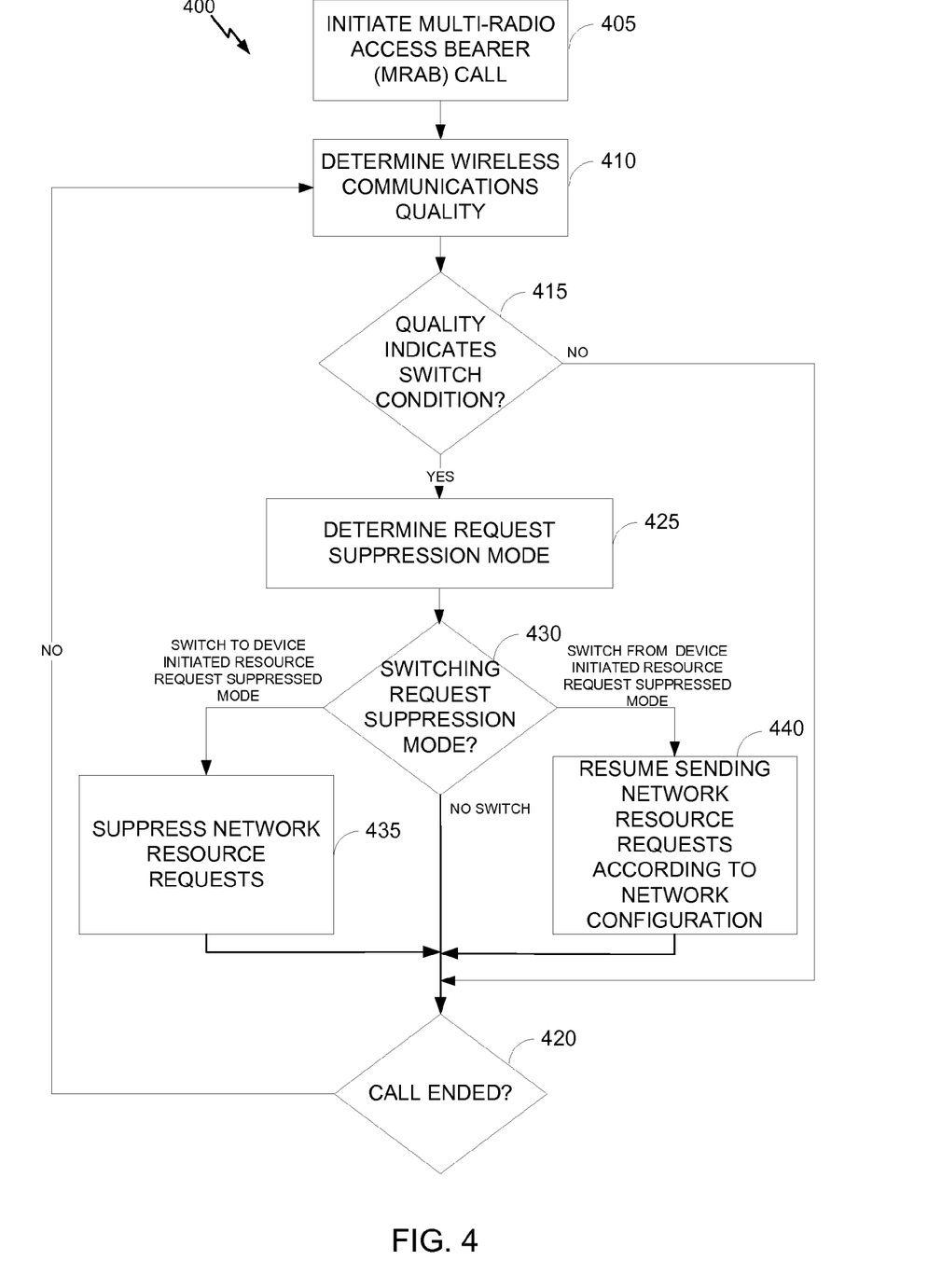
FIG. 4 shows an exemplary flowchart illustrating an implementation of a method of wireless condition based communication in the wireless terminal of FIG. 1.

FIG. 4 shows an exemplary flowchart illustrating an implementation of a method 400 of wireless condition based communication in the wireless terminal 100 of FIG. 1. The method may reduce the occurrence of packet exchange patterns, for example, patterns 380 and 390 illustrated in FIG. 3. These patterns may increase power consumption and network utilization. In addition, they may increase the probability of dropped calls. Through the use of the method illustrated in FIG. 4, power consumption and network utilization of a wireless terminal 100 may be reduced. In addition, the probability of dropped calls may also be reduced.

Although the method 400 is described herein with reference to the wireless terminal 100 discussed above with respect to FIG. 1, a person having ordinary skill in the art will appreciate that the method 400 may be implemented by any other suitable device. In an embodiment, the method 400 may be performed by the CPU 110 in conjunction with the transmitter 162, the receiver 164, and the memory 120. Although the method 400 is described herein with reference to a particular order, in various embodiments, blocks herein may be performed in a different order, or omitted, and additional blocks may be added.

The method 400 begins at block 405 where a multi radio access bearer call is initiated and the wireless terminal 100 is configured to operate in a resource request non-suppressed mode. At block 410, the quality of the wireless communications is determined. The quality of the wireless communication may be determined based on one or more of a wireless signal quality factor (e.g., received signal code power, received signal strength, pilot channel quality, channel quality indicator), a block error rate (e.g., physical layer, medium access control layer, radio link control layer), the number of packets re-transmitted by the wireless terminal 100, the number of packets acknowledged by the base station 101, the number of packets unacknowledged by the base station 101, the occurrence of a radio link control layer reset, the transmit power of the device 100 exceeding a threshold, or other indicia of poor wireless communication conditions. In some implementations, a controller may obtain the various quality indicators directly or indirectly from one or more detectors. A detector may provide the quality indicators by storing the detected quality indicators in a memory. The quality may be discrete or be an aggregated assessment (e.g., average values for a factor, composite calculation including multiple factors).

At decision block 415, the quality determined is assessed to determine if a switch in communication mode is appropriate. For example, a processor, such as CPU 110 of device 100, illustrated in FIG. 1, may compare the quality determined with a threshold wireless quality level stored in a memory, for example, memory 120 of FIG. 1. In the case where the quality indicates a condition wherein a switch is not needed, the method 400 continues to decision block 420. At decision block 420 the method 400 determines whether the call is still active. If the call is active, the method 400 returns to block 410 to again assess the quality of the wireless communications. In some configurations, a timer may be included such that the determination of block 410 is performed at a specified interval.

Returning to block 415, if the quality indicates a condition wherein a switch is needed, the method 400 continues to block 425. At block 425, the current request suppression mode for the data radio bearer in the wireless terminal 100 is determined. According to one implementation, the request suppression modes for the wireless terminal 100 may include: a device-initiated resource request suppressed mode, or resource request unsuppressed mode configured initially by the RAN. In resource request unsuppressed mode, the mobile terminal 100 may send requests for network resources for packet data transmission as defined by the protocol specification defining its interface with the base station 101. For example, the wireless terminal 100 may send a request for network resources for packet data transmission 315 when it has data waiting to be transmitted to the base station 101.

In resource request suppressed mode, the wireless terminal 100 may alter the method utilized to determine whether to send a request for network resources 315 from the method used when in resource request unsuppressed mode. For example, in some aspects, the wireless terminal 100 may not send, in other words may suppress, a request for network resources for packet data transmission 315 when there is data waiting to be transmitted to the base station 101. When in resource request unsuppressed mode, the wireless terminal 100 may send a request for network resources for packet data transmission 315 when it has data waiting to be transmitted to the base station 101.

In some aspects, the wireless terminal 100 may increase a threshold used to determine when to send a request for network resources for packet data transmission 315 based on the resource request mode. For example, when operating in resource request unsuppressed mode, the wireless terminal 100 may compare the amount of data waiting for transmission to a first threshold. When the amount of data is below the first threshold, the wireless terminal 100 may not send a request for network resources for packet data transmission 315. When the amount of data waiting for transmission is above the first threshold, the wireless terminal 100 may send a request for network resources for packet data transmission 315.

When in resource request suppressed mode, the wireless terminal 100 may compare the amount of data waiting for transmission to a second threshold. When the amount of data is below the second threshold, the wireless terminal 100 may not send a request for network resources for packet data transmission 315. When the amount of data waiting for transmission is above the second threshold, the wireless terminal 100 may send a request for network resources for packet data transmission 315. In some aspects, the second threshold may be greater than the first threshold.

At block 430, if the current request suppression mode is the request unsuppressed mode, the method 400 continues to block 435. At block 435, the wireless terminal 100 is configured to switch to device-initiated resource request suppressed mode by suppressing resource requests for packet data transmission 315. Conversely, returning to block 430, if the current RLC mode is device-initiated resource request suppressed mode, the method continues to block 440. At block 440, the wireless terminal 100 is configured to send a network resource request 315 in accordance with the network configuration.

Figure 5:
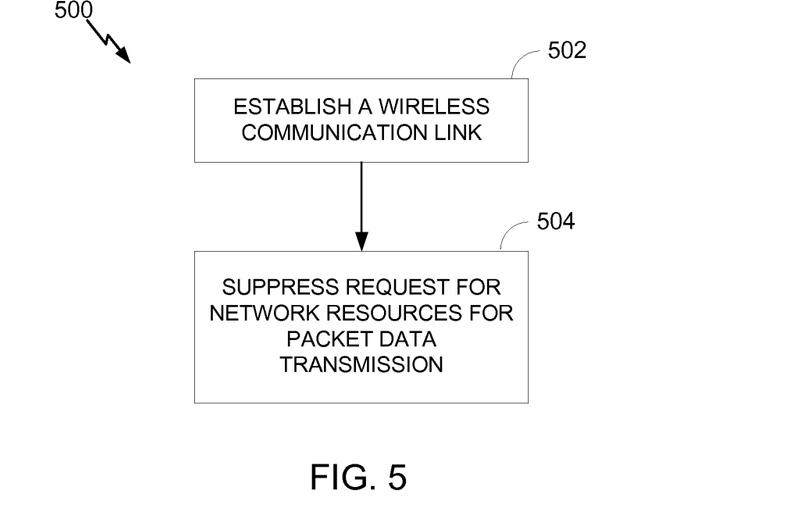
FIG. 5 shows an exemplary flowchart illustrating another implementation of a method of wireless condition based communication in the wireless terminal of FIG. 1.

FIG. 5 is a flowchart illustrating another implementation of a method 500 of transmission power control in the wireless terminal 100 of FIG. 1. Although the method 500 is described herein with reference to the wireless terminal 100 discussed above with respect to FIG. 1, a person having ordinary skill in the art will appreciate that the method 500 may be implemented by any other suitable device. In an embodiment, the method 500 may be performed by the CPU 110 in conjunction with the transmitter 162, the receiver 164, and the memory 120. Although the method 500 is described herein with reference to a particular order, in various embodiments, blocks herein may be performed in a different order, or omitted, and additional blocks may be added.

The method 500 begins at block 502 where the wireless terminal 100 establishes a wireless communication link. At block 504, the wireless terminal 100 suppresses a request for network resources for packet data transmission, such as resource request 315 of FIG. 3. In various embodiments, the request can include a request for one or more of: additional network resources for packet data transmission in an existing voice and data communication, and new network resources for packet data transmission in an existing voice communication. The network resource request may be suppressed based, at least in part, on the condition of the wireless communication link, such as those quality factors discussed above, and/or the type of wireless communication (e.g., MRAB).

Figure 6:
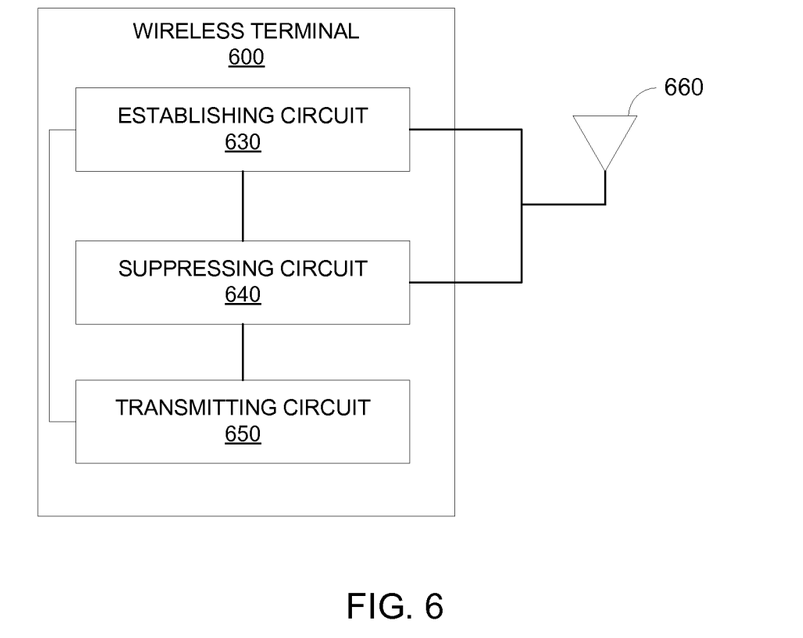
FIG. 6 shows an exemplary functional block diagram of another wireless terminal.

FIG. 6 shows an exemplary functional block diagram of another wireless terminal, such as wireless terminal 100 of FIG. 3. Those skilled in the art will appreciate that a wireless terminal may have more components than the simplified wireless terminal 600 illustrated in FIG. 6. The wireless terminal 600 illustrates only those components useful for describing some prominent features of implementations within the scope of the claims.

The wireless terminal 600 includes an establishing circuit 630, a suppressing circuit 640, a transmitting circuit 650, and an antenna 660. In one implementation the establishing circuit 630 is configured to establish a wireless communication link. In one implementation, means for establishing includes an establishing circuit 630. In one implementation, the suppressing circuit 640 is configured to suppress a request for network resources for packet data transmission based in part on a condition of the wireless communication link and a type of wireless communication. In some implementations, the means for suppressing includes a suppressing circuit 640. The transmitting circuit 650 may transmit data, including the traffic volume request, to a base station via the antenna 660. In one implementation, means for transmitting includes a transmitting circuit 650.

Figure 7:
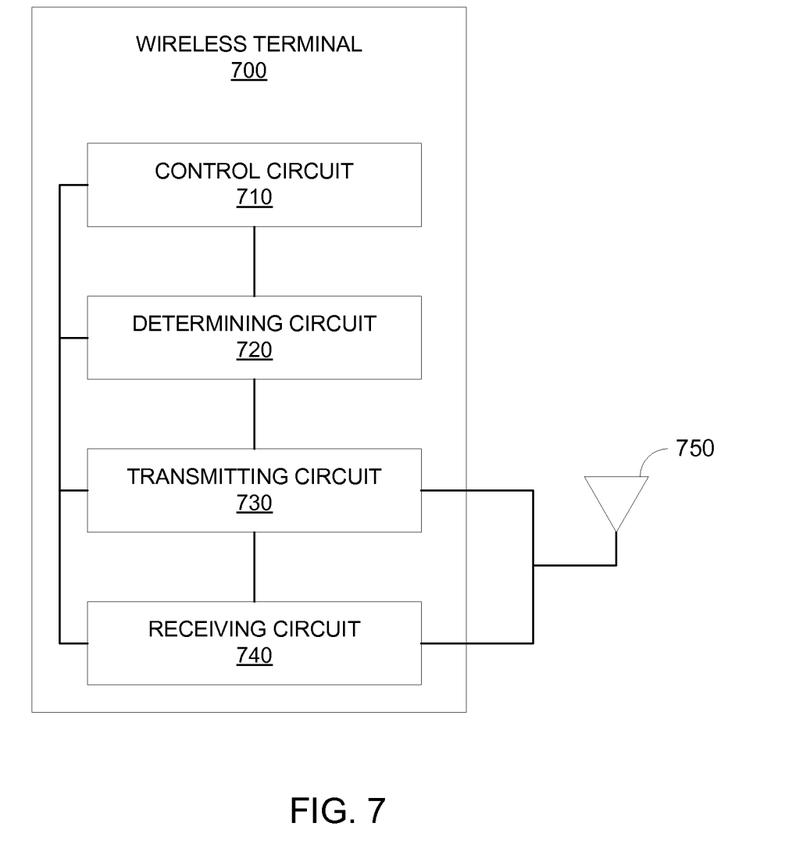
FIG. 7 shows an exemplary functional block diagram of another wireless terminal.

FIG. 7 shows an exemplary functional block diagram of another wireless terminal, such as wireless terminal 100 of FIG. 3. Those skilled in the art will appreciate that a wireless terminal may have more components than the simplified wireless terminal 700 illustrated in FIG. 7. The wireless terminal 700 includes only those components useful for describing some prominent features of implementations within the scope of the claims.

The wireless terminal 700 includes a control circuit 710, a determining circuit 720, a transmitting circuit 730, a receiving circuit 740 and an antenna 750. In one implementation the control circuit is configured to control new wireless communication session initiation requests. In one implementation, means for transmitting the new session establishment request to a wireless communication network upon satisfactory quality of the at least one of current wireless communication sessions and further means for rejecting the new session establishment request upon unsatisfactory quality of the at least one of current wireless communication sessions include a control circuit. In one implementation the determining circuit 720 is configured to determine quality of at least one of current wireless communication sessions, e.g., a current ongoing voice communication session. In one implementation, means for determining includes a determining circuit. In one implementation, the transmitting circuit 730 is configured to transmit data to a base station via the antenna 750. In one implementation, means for transmitting includes a transmitting circuit. In one implementation, the receiving circuit 740 is configured to receive data from a base station via the antenna 750. In one implementation, means for receiving includes a receiving circuit.

A wireless terminal may comprise, be implemented as, or known as user equipment, a subscriber station, a subscriber unit, a mobile station, a mobile phone, a mobile node, a remote station, a remote terminal, a user terminal, a user agent, a user device, or some other terminology. In some implementations a wireless terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

A base station may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a base station may comprise an access node for a communication system. Such an access node may provide, for example, connectivity for or to a network (e.g., a wide area network such as the Internet or a cellular network) via a wired or wireless communication link to the network. Accordingly, a base station may enable another node (e.g., a wireless terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless terminal or node may communicate via one or more wireless communication links that are based on or otherwise support any suitable wireless communication technology. For example, in some aspects a wireless terminal may associate with a network. In some aspects the network may comprise a local area network or a wide area network. A wireless terminal may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless terminal may support or otherwise use one or more of a variety of corresponding modulation or multiplexing schemes. A wireless terminal may thus include appropriate components (e.g., air interfaces) to establish and communicate via one or more wireless communication links using the above or other wireless communication technologies. For example, a wireless terminal may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), a wireless terminal, or a base station. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use implementations within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:
1. A method of wireless communication, comprising:
   establishing a wireless communication link having simultaneously a data connection and a voice connection;
   determining a quality of the wireless communication link;
   accumulating, at a wireless device, an amount of data for transmission to a base station;
   transmitting, by the wireless device, a traffic volume indication to the base station in response to the accumulated amount of data being above a data threshold and the determined quality of the wireless communication link being above a quality threshold;

suppressing, in the wireless device, a transmission of the traffic volume indication in response to the accumulated amount of data being below the data threshold and the determined quality of the wireless communication link being below the quality threshold; and wherein the determining and the suppressing are performed after the establishing of the wireless communication link wherein the wireless device is already provided with both the data and the voice connection.

2. The method of claim 1, wherein the suppressing based on the determined quality comprises suppressing the transmission of the traffic volume indication if the determined quality of the wireless communication link does not support packet data transmission.

3. The method of claim 1, wherein the suppressing based on the determined quality comprises suppressing the transmission of the traffic volume indication if the wireless device is power limited.

4. The method of claim 1, wherein the data connection and the voice connection are carried over a multiple radio access bearer.

5. The method of claim 1, wherein the wireless communication link comprises a universal telecommunication system.

6. The method of claim 1, wherein the wireless communication link comprises a 3G system.

7. The method of claim 1, wherein the suppressing of the transmission of the traffic volume indication comprises not transmitting the traffic volume indication in response to the wireless device having data waiting for transmission on the data connection.

8. The method of claim 1, wherein the suppressing of the transmission of the traffic volume indication comprises increasing the data threshold used for determining whether to send the traffic volume indication based on an amount of data waiting for transmission on the data connection.

9. The method of claim 1, wherein the determining the quality is based at least on one of a signal quality of a wireless signal received by the wireless device, an error rate for signals received by the wireless device, a number of packet re-transmissions from the wireless device, or a reset of the wireless communication link.

10. The method of claim 1, wherein the determining the quality is based at least on a condition of the wireless communication link, a type of existing wireless communication being transmitted, or a power state of the wireless device.

11. The method of claim 1, further comprising comparing the accumulated amount of data to the data threshold or alternatively to a second larger data threshold in response to the determined quality either meeting or not meeting the quality threshold, respectively, and wherein suppressing the traffic volume indication on the established data connection comprises suppressing the traffic volume indication in response to the comparison.

12. A device configured to communicate via a wireless communication link, the device comprising:
a transmitter configured to establish the wireless communication link having simultaneously a data connection and a voice connection and to transmit a wireless communication;
a determining circuit configured to determine a quality of the wireless communication link and an amount of data accumulated, at the device, for transmission to a base station, wherein the transmitter is further configured to transmit a traffic volume indication to the base station in response to the accumulated amount of data being above a data threshold and the determined quality of the wireless communication link being above a quality threshold;
a controller configured to suppress a transmission of the traffic volume indication in response to the accumulated amount of data being below the data threshold and the determined quality of the wireless communication link being below the quality threshold; and
wherein the determining and the suppressing are performed after the establishing of the wireless communication link wherein the device is already provided with both the data and the voice connection.

13. The device of claim 12, wherein the controller is further configured to suppress the transmission of the traffic volume indication if the determined quality of the wireless communication link does not support packet data transmission.

14. The device of claim 12, wherein the controller is further configured to suppress the transmission of the traffic volume indication if the device is power limited.

15. The device of claim 12, wherein the data connection and the voice connection are carried over a multiple radio access bearer.

16. The device of claim 12, wherein the wireless communication link comprises a universal mobile telecommunication system.

17. The device of claim 12, wherein the wireless communication link comprises a 3G system.

18. The device of claim 12, wherein the controller is further configured to suppress the transmission of the traffic volume indication by not transmitting the traffic volume indication in response to the device having data waiting for transmission on the data connection.

19. The device of claim 12, wherein the controller is further configured to suppress the traffic volume indication by increasing the data threshold used for determining whether to send the traffic volume indication based on an amount of data waiting for transmission on the data connection.

20. The device of claim 12, wherein the determining circuit is configured to determine the quality based at least on information made available at application level via application programming interface (API).

21. The device of claim 12, wherein the determining circuit is configured to determine the quality based at least on one of a signal quality of a wireless signal received by the device, an error rate for signals received by the device, a number of packet re-transmissions from the device, or a reset of the wireless communication link.

22. The device of claim 12, wherein the determining circuit is configured to determine the quality based at least on a condition of the wireless communication link, a type of existing wireless communication being transmitted, or a power state of the device.

23. The device of claim 12, wherein the controller is further configured to compare the accumulated amount of data to the data threshold or alternatively to a second larger data threshold in response to the determined quality either meeting or not meeting the quality threshold, respectively, and wherein suppressing the traffic volume indication on the established data connection comprises suppressing the traffic volume indication in response to the comparison.

24. A device configured to communicate via a wireless communication link, the device comprising:
means for establishing the wireless communication link having simultaneously a data connection and a voice connection;

means for determining a quality of the wireless communication link;

means for accumulating an amount of data for transmission to a base station;

means for transmitting a traffic volume indication to the base station in response to the accumulated amount of data being above a data threshold and the determined quality of the wireless communication link being above a quality threshold;

means for suppressing a transmission of the traffic volume indication in response to the accumulated amount of data being below the data threshold and the determined quality of the wireless communication link being below the quality threshold; and wherein the determining and the suppressing are performed after the establishing of the wireless communication link wherein the device is already provided with both the data and the voice connection.

25. The device of claim 24, wherein the means for suppressing the traffic volume indication based on the determined quality is configured to suppress the traffic volume indication if the determined quality of the wireless communication link does not support packet data transmission.

26. The device of claim 24, wherein the means for suppressing the traffic volume indication based on the determined quality is configured to suppress the traffic volume indication if the device is power limited.

27. The device of claim 24, wherein the data connection and the voice connection are carried over a multiple radio access bearer.

28. The device of claim 24, wherein the wireless communication link comprises a universal mobile telecommunication system.

29. The device of claim 24, wherein the wireless communication link comprises a 3G system.

30. The device of claim 24, wherein the means for suppressing the traffic volume indication is configured to suppress the traffic volume indication by not transmitting the traffic volume indication in response to the device having data waiting for transmission on the data connection.

31. The device of claim 24, wherein the means for suppressing the traffic volume indication is configured to suppress the traffic volume indication by increasing the data threshold used for determining whether to send the traffic volume indication based on an amount of data waiting for transmission on the data connection.

32. The device of claim 24, wherein the quality is determined based at least on information made available at application level via application programming interface (API).

33. The device of claim 24, wherein the quality is determined based at least on one of a signal quality of a wireless signal received by the device, an error rate for signals received by the device, a number of packet re-transmissions from the device, or a reset of the wireless communication link.

34. The device of claim 24, wherein the quality is determined based at least on a condition of the wireless communication link, a type of existing wireless communication being transmitted, or a power state of the device.

35. A non-transitory computer readable storage medium comprising instructions that, when executed by at least one processor of an apparatus, cause the apparatus to:

establish a wireless communication link having simultaneously a data connection and a voice connection;

determine a quality of the wireless communication link and an amount of data accumulated, at the apparatus, for transmission to a base station;

transmit a traffic volume indication to the base station in response to the accumulated amount of data being above a data threshold and the determined quality of the wireless communication link being above a quality threshold;

suppress, in the apparatus, a transmission of the traffic volume indication in response to the accumulated amount of data being below the data threshold and the determined quality of the wireless communication link being below the quality threshold; and wherein the determine and the suppress are performed after the establish wherein the apparatus is already provided with both the data and the voice connection.

36. The medium of claim 35, wherein the instructions to suppress based on the determined quality comprise instructions to suppress the traffic volume indication if the determined quality of the wireless communication link does not support packet data transmission.

37. The medium of claim 35, wherein the instructions to suppress based on the determined quality comprise instructions to suppress the traffic volume indication if the apparatus is power limited.

38. The medium of claim 35, wherein the data connection and the voice connection are carried over a multiple radio access bearer.

39. The medium of claim 35, wherein the wireless communication link comprises a universal telecommunication system.

40. The medium of claim 35, wherein the wireless communication link comprises a 3G system.

41. The medium of claim 35, wherein the instructions to suppress comprise instructions to suppress the traffic volume indication by not transmitting the traffic volume indication in response to the apparatus having data waiting for transmission on the data connection.

42. The medium of claim 35, wherein the instructions to suppress comprise instructions to suppress the traffic volume indication by increasing the data threshold used for determining whether to send the traffic volume indication based on an amount of data waiting for transmission on the data connection.

43. The medium of claim 35, wherein the determined quality is determined based at least on information made available at an application level via an application programming interface (API).

44. The medium of claim 35, wherein the determined quality is determined based at least on one of a signal quality of a wireless signal received by the apparatus, an error rate for signals received by the apparatus, a number of packet re-transmissions from the apparatus, or a reset of the wireless communication link.

45. The medium of claim 35, wherein the quality is determined based at least on a condition of the wireless communication link, a type of existing wireless communication being transmitted, or a power state of the apparatus.

* * * * *